United States Patent
Xia et al.

(10) Patent No.: US 9,954,225 B2
(45) Date of Patent: Apr. 24, 2018

(54) POSITIVE ELECTRODE MATERIAL FOR LITHIUM BATTERY, PREPARING METHOD THEREOF AND LITHIUM BATTERY

(75) Inventors: Yonggao Xia, Zhejiang (CN); Zhaoping Liu, Zhejiang (CN); Yaletu Saixi, Zhejiang (CN)

(73) Assignees: NINGBO INSTITUTE OF MATERIALS TECHNOLOGY AND ENGINEERING, CHINESE ACADEMY OF SCIENCES, Zhejiang (CN); HUBEI WANRUN NEW ENERGY TECHNOLOGY DEVELOPMENT CO. LTD, Hubei (CN)

( * ) Notice: Subject to any disclaimer, the term of this patent is extended or adjusted under 35 U.S.C. 154(b) by 581 days.

(21) Appl. No.: 14/119,721

(22) PCT Filed: May 23, 2011

(86) PCT No.: PCT/CN2011/074493
§ 371 (c)(1),
(2), (4) Date: Feb. 24, 2014

(87) PCT Pub. No.: WO2012/159253
PCT Pub. Date: Nov. 29, 2012

(65) Prior Publication Data
US 2014/0170492 A1    Jun. 19, 2014

(51) Int. Cl.
*H01M 4/505* (2010.01)
*H01M 4/131* (2010.01)
(Continued)

(52) U.S. Cl.
CPC ............ *H01M 4/505* (2013.01); *C01D 15/02* (2013.01); *H01M 4/131* (2013.01); *H01M 4/364* (2013.01)

(58) Field of Classification Search
None
See application file for complete search history.

(56) References Cited

U.S. PATENT DOCUMENTS 7,807,298 B2 * 10/2010 Takeuchi ............ C01G 23/002
                                                                429/218.1
2002/0157963 A1 * 10/2002 Davis .................... C01G 45/02
                                                                205/539

(Continued)

FOREIGN PATENT DOCUMENTS

CN           1787254         6/2006
CN         101335348       12/2008
(Continued)

OTHER PUBLICATIONS

Jian et al. (CN101335348) (a raw machine translation) (Abstract and Detailed Description) (Dec. 31, 2008).*

(Continued)

*Primary Examiner* — Miriam Stagg
*Assistant Examiner* — Carmen V Lyles-Irving
(74) *Attorney, Agent, or Firm* — Vierra Magen Marcus LLP

(57) ABSTRACT

Provided is a positive electrode material for a lithium battery with an atomic ratio expressed by the formula (I) $Li_a(M_xMn_{2-x})(O_{4-y}Z_y)$ for $0.8 \leq a \leq 1.2$, $0 \leq x \leq 1$ and $0 \leq y \leq 1$ in which M is one or more of Li, Na, K, Ca, Mg, Al, Ti, Sc, Ge, V, Cr, Zr, Co, Ni, Zn, Cu, La, Ce, Mn, Hf, Nb, Ta, Mo, W, Ru, Ag, Sn, Pb and Si and Z is one or more of OH, halogens, N, P, S and O, and the primary particles of the positive electrode material have a spheroidal topography. The adjacent (111) family planes of the primary particles are connected by curved surfaces without obvious edges. A preparing method of a positive electrode material for a lithium battery and a lithium battery are also provided. The positive (Continued)

electrode material of the present invention provides a good high-temperature cycling performance and filling capability.

6 Claims, 3 Drawing Sheets

(51) Int. Cl.
*H01M 4/36* (2006.01)
*C01D 15/02* (2006.01)

(56) References Cited

U.S. PATENT DOCUMENTS

| | | | |
|---|---|---|---|
| 2006/0239883 | A1 | 10/2006 | Kang et al. |
| 2007/0224506 | A1* | 9/2007 | Ooyama ............ C01G 23/04 429/231.3 |
| 2009/0297947 | A1 | 12/2009 | Deng et al. |
| 2011/0136011 | A1 | 6/2011 | Yura et al. |
| 2011/0297876 | A1 | 12/2011 | Masukuni et al. |

FOREIGN PATENT DOCUMENTS

| | | |
|---|---|---|
| CN | 101587950 | 11/2009 |
| CN | 101764223 | 6/2010 |
| EP | 2381515 A1 | 10/2011 |
| JP | 2000215895 | 8/2000 |
| JP | 2002053321 A | 2/2002 |
| JP | 2002529352 A | 9/2002 |
| JP | 2010192428 A | 9/2010 |
| JP | 2010212262 A | 9/2010 |
| JP | 2010219065 A | 9/2010 |
| JP | 2011023221 | 2/2011 |
| WO | 0027754 | 5/2000 |

OTHER PUBLICATIONS

Masayuki et al. (WO 2010084855) (a raw machine translation) (Abstract & Detailed Description) (Jul. 29, 2010).*
Thackeray, M.M., et al. "Electrochemical Extraction of Lithium from LiMn2O4." Materials Research Bulletin 19.2 (1984): 179-187.*
English Abstract of CN1787254, published Jun. 14, 2006.
English Abstract of CN101335348, published Dec. 31, 2008.
English Abstract of CN101587950, published Nov. 25, 2009.
English Abstract of CN101764223, published Jun. 30, 2010.
English Abstract of JP2000215895, published Aug. 4, 2000.
English Abstract of JP2011023221, published Feb. 3, 2011.
Office Action dated Nov. 4, 2014 in Japanese Patent Application No. 2014511698 with English translation, 5 pages.
English Translation of Claims of JP2002529352A, published Sep. 10, 2002.
English Abstract of JP2002053321A, published Feb. 19, 2002.
English Abstract of JP2010192428A, published Sep. 2, 2010.
English Abstract of JP2010212262A, published Sep. 24, 2010.
English Abstract of JP2010219065, published Sep. 30, 2010.
Office Action with English translation dated Apr. 7, 2015 in Korean Patent Application No. 10-2013-7033738, 8 pages.
Y.S. Lee et al, "Preparation and characterization of nano-crystalline LiNi0.5Mn1.5O4 for 5 V cathode material by composite carbonate process" Electrochemistry Communications, vol. 4 (2002), pp. 989-994 (published on Nov. 16, 2002).
EP Communication and Search Report dated Sep. 11, 2015, in European Patent Application No. 11866039.8.
International Search Report dated Oct. 20, 2011, in International Patent Application No. PCT/CN2011/074493 filed May 23, 2011.

* cited by examiner

POSITIVE ELECTRODE MATERIAL FOR LITHIUM BATTERY, PREPARING METHOD THEREOF AND LITHIUM BATTERY

TECHNICAL FIELD

The present invention belongs to the technical field of lithium ion battery, particularly relates to a positive electrode material for lithium ion battery, a method for preparing the same and a lithium ion battery.

BACKGROUND OF THE INVENTION

Lithium ion battery is a chargeable battery which mainly relies on movement of lithium ions between a positive electrode and a negative electrode to achieve charge/discharge. Lithium ion batteries have the advantages of high safety, high voltage and specific energy, long charge/discharge cycle life, etc., thus are widely used in portable electrical appliances such as mobile phone, notebook PC and camera.

Positive electrode material is a core part of a lithium ion battery. The prior art has disclosed a plurality of positive electrode materials for lithium ion battery, such as lithium cobalt oxide, lithium iron phosphate, and lithium manganese oxide, where lithium cobalt oxide has the advantages of high capacity, high voltage, ease of preparation and the like, but cobalt is expensive and harmful to the environment; lithium iron phosphate has the merits of high safety, long cycle life, etc., whereas the electrode made has poor processability and consistency; lithium manganese oxide is a material having three-dimensional lithium ion diffusion channels, and has the advantages of low price, high electric potential, environmental friendliness, high safety, etc., and lithium manganese oxide material is suitable for use in large-scale energy-storage batteries for electric vehicles and the like, thus has become one of the hot research topics. However, the lithium ion batteries using lithium manganese oxide as the positive electrode material has a drawback of poor high-temperature cycling performance which limits further application thereof.

In existing studies, it is generally believed that the specific surface area of lithium manganese oxide is one of the important factors that affect the high-temperature cycling performance of lithium ion batteries, and low specific surface area can reduce contact of lithium manganese oxide with electrolyte solution and thereby reduces dissolution of manganese and improves the high-temperature cycling performance of lithium ion batteries. Currently, lithium manganese oxide material is generally coated with oxide or fluoride or doped with other elements and then sintered at high temperature to obtain lithium manganese oxide having low specific surface area. For example, Chinese patent application publication No. CN1787254 discloses a positive electrode material for lithium ion battery, which is prepared by dissolving a soluble metal salt in a solvent, adding spinel lithium manganate or derivatives thereof to form a suspension, then spray drying the suspension, granulating and calcining to give spinel lithium manganate coated with a metal oxide. Although such coating can improve the high-temperature performance of lithium manganese oxide material to a certain extent, the coating increases steps for producing spinel lithium manganate, and it is difficult to guarantee consistency of the product.

Another Chinese patent application publication No. CN1455466 discloses a spinel lithium manganate with a stable structure which is prepared by calcination of electrolytic manganese dioxide, lithium carbonate, cobalt oxide and a multi-component dopant consisting of nickel, chromium, iron, manganese, selenium and fluorin at a high temperature. This method improves the cycling performance of lithium manganate, but the high-temperature cycling performance thereof is still relatively low. Another Chinese patent application publication No. CN101587950 discloses a lithium manganate consisting of micron-scaled single crystals of regular octahedral shape, which is obtained by ball milling and mixing a composite oxide of manganese and modified metal M and a lithium salt and then calcining. The lithium manganese oxide material obtained by the method has a small specific surface area and an improved high-temperature cycling performance, but poor filling capability.

SUMMARY OF THE INVENTION

In view of the above, the technical problem to be solved by the present invention is to provide a positive electrode material for lithium ion battery, a method for preparing the same and a lithium ion battery. The positive electrode material provided by the present application is a lithium manganese oxide compound with spheroidal morphology which exhibits good filling capability and high-temperature cycling performance.

The present invention provides a positive electrode material for lithium ion battery, having an atomic composition represented by formula (I):

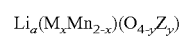

$$Li_a(M_xMn_{2-x})(O_{4-y}Z_y) \quad \text{(I);}$$

Wherein
0.8≤a≤1.2, 0≤x≤1 and 0≤y≤1;

M is one or more selected from the group consisting of Li, Na, K, Ca, Mg, Al, Ti, Sc, Ge, V, Cr, Zr, Co, Ni, Zn, Cu, La, Ce, Mn, Hf, Nb, Ta, Mo, W, Ru, Ag, Sn, Pb, and Si;

Z is one or more selected from the group consisting of OH, halogen, N, P, S and O; and the primary particles of the positive electrode material have spheroidal morphologies, and the (111) planes thereof are connected with adjacent equivalent crystal planes by curved surfaces without obvious edges.

Preferably, the primary particles of the positive electrode material have a particle size ranging from 1 to 20 μm.

Compared with the prior art, the positive electrode material for lithium ion battery provided in the present invention has the atomic composition represented by formula (I), and has a crystal structure of cubic spinel (FD-3m). The primary particles of the positive electrode material are spheroidal in shapes and the (111) planes thereof are connected with adjacent equivalent crystal planes by curved surfaces without obvious edges. The positive electrode material provided in the present invention has spheroidal morphology, no obvious edges and sharp vertex on the surface and a larger angle between adjacent crystal faces. Therefore, manganese dissolution in electrolyte takes place less readily, and better high-temperature cycling performance and filling capability are provided.

The present invention further provides a method for preparing a positive electrode material for lithium ion battery, comprising the following steps:

a) mixing a manganese-containing compound with a solvent to obtain a solution of the manganese-containing compound;

b) adding a precipitant to the solution of the manganese-containing compound obtained from the step a) to form a precipitate, the precipitant being alkali metal hydroxide solution, alkali metal carbonate solution or alkali metal bicarbonate solution;

c) calcining the precipitate obtained from the step b) to give a positive electrode material precursor;

d) mixing the positive electrode material precursor obtained from the step (c), MnS and a lithium-containing compound, then calcining and grinding to obtain a solid powder; and e) subjecting the solid powder obtained from the step d) to annealing treatment to give the positive electrode material for lithium ion battery.

Preferably, the step a) specifically comprises mixing the manganese-containing compound with a displacer in the solvent to obtain the solution of the manganese-containing compound, wherein the displacer is one or more selected from the group consisting of a Li-containing compound, a Na-containing compound, a K-containing compound, a Ca-containing compound, a Mg-containing compound, a Al-containing compound, a Ti-containing compound, a Sc-containing compound, a Ge-containing compound, a V-containing compound, a Cr-containing compound, a Zr-containing compound, a Co-containing compound, a Ni-containing compound, a Zn-containing compound, a Cu-containing compound, a La-containing compound, a Ce-containing compound, a Mn-containing compound, a Hf-containing compound, a Nb-containing compound, a Ta-containing compound, a Ag-containing compound, a Sn-containing compound, a Pb-containing compound, and a Si-containing compound.

Preferably, the manganese-containing compound is one or more selected from the group consisting of manganese sulfate, manganese carbonate, manganese nitrate, manganese chloride, and manganese oxalate.

Preferably, the solvent is water, methanol, ethanol or acetone.

Preferably, the step b) specifically comprises:

adding a precipitant to the solution of the manganese-containing compound obtained from the step a) and regulating pH value to 6 to 13 so as to give a precipitate.

Preferably, the lithium-containing compound in the step d) is one ore more selected from the group consisting of lithium hydroxide, lithium carbonate, lithium nitrate, lithium oxalate, lithium chloride and lithium fluoride.

Preferably, in the step d), the molar ratio of MnS to the lithium element in the lithium-containing compound is (0.001-0.1): (0.8-1.2).

Preferably, in the step c), the calcining temperature is 300 to 800° C., and the calcining time is 1 to 10 h.

Preferably, in the step d), the calcining temperature is 750 to 1200° C., and the calcining time is 1 to 48 h.

Preferably, in the step e), the annealing temperature is 400 to 800° C., and the annealing time is 1 to 12 h.

The present invention further provides a lithium ion battery comprising a positive electrode, a negative electrode, an electrolyte disposed between the positive electrode and the negative electrode, characterized in that the positive electrode comprises the positive electrode material described in the aforementioned technical solutions or the positive electrode material prepared by the method described in the aforementioned technical solutions.

In the present invention, firstly a manganese-containing compound or a mixture of a manganese-containing compound and a displacer is mixed with a solvent, and then added with a precipitant to give a manganese-containing precipitate or precipitate containing manganese and the displacing element. Afterwards, the precipitate is calcined to obtain a positive electrode material precursor. Then, the positive electrode material precursor is mixed with MnS and a lithium-containing compound, and the resultant mixture is calcined and annealed to form a positive electrode material for lithium ion battery. The positive electrode material prepared using the method provided in the present invention has a crystal structure of cubic spinel (FD-3m), comprises lithium, manganese and oxygen as the main components, and is suitable for serving as positive electrodes of lithium ion batteries. The primary particles of the lithium manganese oxide positive electrode material obtained using the method provided in the present invention have spheroidal morphologies. The (111) planes of the primary particle are connected with adjacent equivalent crystal planes by curved surfaces without obvious edges, and the crystal planes forms an obtuse angle with the adjacent crystal faces. The spheroidal structure not only provides high filling capability, but also imparts the lithium manganese oxide positive electrode material with a relatively lower specific surface area, which enables dissolution of manganese element at high temperature to occur less readily, thereby improving the high-temperature cycling performance and filling capability of the positive electrode material. Experiments have shown that the lithium manganese oxide compound with spheroidal morphology has a lower specific surface area, a lower amount of manganese dissolution, and a better high-temperature cycling performance and filling capability than the lithium manganese oxide having octahedral morphology.

DESCRIPTION OF THE DRAWINGS

In order to more clearly demonstrate examples of the present invention or the technical solutions in the prior art, the drawings needed for depicting the examples or the prior art are introduced simply. Apparently, the drawings in the following description are merely some examples of the present invention. To those skilled in the art, they can further obtain other drawings according to these drawings without any creative work.

DETAILED EMBODIMENTS

Figure 1:
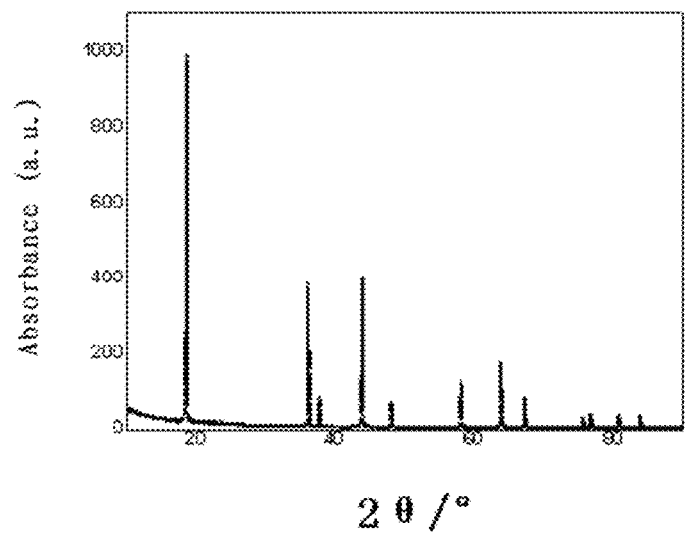
FIG. 1 shows an X-ray diffraction pattern of the lithium manganese oxide material provided in example 1 of the present invention.

The technical solutions in the examples of the present invention will be described clearly and fully with reference to the drawings in the examples of the present invention. Apparently, the described examples are merely part of examples of the present invention rather than all examples. Based on the examples of the present invention, all other examples obtainable by those skilled in the art without any creative work will fall within the protection scope of the present invention.

The present invention provides a positive electrode material for lithium ion battery, having an atomic composition represented by formula (I):

$$Li_a(M_xMn_{2-x})(O_{4-y}Z_y) \quad (I);$$

Wherein $0.8 \leq a \leq 1.2$, $0 \leq x \leq 1$ and $0 \leq y \leq 1$;

M is one or more selected from the group consisting of Li, Na, K, Ca, Mg, Al, Ti, Sc, Ge, V, Cr, Zr, Co, Ni, Zn, Cu, La, Ce, Mn, Hf, Nb, Ta, Mo, W, Ru, Ag, Sn, Pb, and Si; and Z is one or more selected from the group consisting of OH, halogen, N, P, S and O; and the primary particles of the positive electrode material have spheroidal morphologies, and the (111) planes thereof are connected with adjacent equivalent crystal planes by curved surfaces without obvious edges.

The positive electrode material provided in the present invention has an atomic composition represented by formula (I). That is, the positive electrode material comprises lithium, manganese and oxygen as main components, wherein:

a satisfies the following conditions: $0.8 \leq a \leq 1.2$, more preferably $0.9 \leq a \leq 1.1$;

x satisfies the following conditions: $0 \leq x \leq 1$, more preferably $0.01 \leq x \leq 0.5$;

y satisfies the following conditions: $0 \leq y \leq 1$, more preferably $0.01 \leq y \leq 0.5$.

M represents a displacing element, and is preferably one or more selected from the group consisting of Mg, Al, Ti, Sc, Ge, V, Cr, Zr, Co, Ni, Zn, Cu, La, Ce, Mn, Hf, Nb, Ta, Mo, W, Ru, Ag, Sn, Pb and Si, more preferably Mg, Al, Ti, Ge, V, Cr, Zr, Co, Ni, La, Ce or Nb; and Z is one or more selected from the group consisting of OH, halogen, N, P, S and O, preferably halogen, N, P or S, more preferably, halogen.

The positive electrode material is a lithium manganese oxide compound which has a cubic spinel (FD-3m) structure, and it can be used as positive electrode material for lithium ion batteries.

In order to make the positive electrode material possess good filling capability, good high-temperature cycling performance and low manganese dissolution, the primary particles of the positive electrode material have spheroidal morphologies, and the (111) planes thereof are connected with adjacent equivalent crystal planes by curved surfaces without obvious edges. That is, the primary particles of the positive electrode material have no obvious edges and sharp vertex on the surface, and the angle formed between the (111) plane and the adjacent crystal plane is relatively large.

In the present invention, in addition to the morphologies formed by individual primary particle, the spheroidal morphologies further comprises the morphologies formed by intersection among the primary particles, the morphologies formed due to common crystal faces of the primary particles, the morphologies that other primary particles grow on the surface of a primary particle, the morphologies formed by deficiency of a part of a primary particle, or the morphologies formed by sharing crystal face among primary particles.

In the present invention, the primary particles of the positive electrode material may further comprise octahedral morphologies, dodecahedral morphologies or morphologies of other shapes in addition to spheroidal morphologies. The primary particles having spheroidal morphologies preferably account for 50% or more, more preferably 80% or more, and most preferably 90% or more. The morphologies of the primary particles of the positive electrode material can be determined by an electron microscope.

The particle size of the primary particles of the positive electrode material according to the present invention is preferably 1 to 20 μm, more preferably, 2 to 15 μm, and most preferably 3 to 10 μm.

The positive electrode material has a low specific surface area which is preferably 0.1 to 1 m$^2$/g, more preferably, 0.3 to 0.7 m$^2$/g.

The positive electrode material has a high tap density which is preferably 1.8 to 2.5 g/cm$^3$, more preferably 1.9 to 2.1 g/cm$^3$.

Mn in the positive electrode material exhibits low dissolution in electrolyte solution. After standing for 7 days in an electrolyte solution at 60° C. which consists of a 1 mol/L LiPF$_6$ solution in ethylene carbonate (EC) and dimethyl carbonate (DMC) mixed at a volume ratio of 1:1, the dissolution of manganese is preferably 0.001 to 0.03 mol/L, more preferably 0.005 to 0.025 mol/L, most preferably, 0.01 to 0.02 mol/L.

The positive electrode material has good filling capability. The positive electrode plate manufactured from the positive electrode material, acetylene black, and polyvinylidene fluoride preferably has a compact density of 2.50 to 4 g/cm$^3$, more preferably 2.80 to 3.5 g/cm$^3$, most preferably 2.90 to 3.2 g/cm$^3$.

The positive electrode material provided in the present invention has spheroidal morphologies, in which no obvious edges and sharp vertex are present on the surface and a large angle is formed between adjacent crystal faces. Therefore, manganese dissolution in the electrolyte solution takes place less readily, and better high-temperature cycling performance and filling capability are provided.

The present invention further provides a method for preparing a positive electrode material for lithium ion battery, comprising the following steps:

a) mixing a manganese-containing compound with a solvent to obtain a solution of the manganese-containing compound;

b) adding a precipitant to the solution of the manganese-containing compound obtained from the step a) to form a precipitate, the precipitant being alkali metal hydroxide solution, alkali metal carbonate solution or alkali metal bicarbonate solution;

c) calcining the precipitate obtained from the step b) to give a positive electrode material precursor;

d) mixing the positive electrode material precursor obtained from the step (c), MnS and a lithium-containing compound, then calcining and grinding to obtain a solid powder; and e) subjecting the solid powder obtained from the step d) to annealing treatment to give the positive electrode material for lithium ion battery.

A liquid phase method is adopted in the present invention for preparing the positive electrode material precursor. Displacing element is mixed uniformly with manganese element to thereby improve the high-temperature cycling performance of the positive electrode material. Afterwards, MnS as a crystal face modifier, the positive electrode material precursor and a lithium-containing compound are mixed, calcined and annealed to obtain a lithium manganese oxide positive electrode material whose primary particles are spheroidal in shape.

In the present invention, a manganese-containing compound is first mixed with a solvent to form a solution.

According to the present invention, the manganese-containing compound is a compound that contains manganese element, and is preferably one or more selected from the group consisting of manganese sulfate, manganese carbonate, manganese nitrate, manganese chloride, and manganese oxalate, more preferably, manganese sulfate, manganese nitrate or manganese chloride.

In the present invention, the solvent is preferably water, methanol, ethanol or acetone, more preferably, water.

In order to improve performance of the obtained positive electrode material, the positive electrode materials doped with other elements are preferably prepared in the present invention, i.e. it is preferred to mix a manganese-containing compound with a displacer in a solvent to give a solution of the manganese-containing compound.

In the present invention, the function of the displacer is to provide a doping element so as to impart the positive electrode material with better high-temperature cycling performance. The displacer may be one or more selected from the group consisting of a Li-containing compound, a Na-containing compound, a K-containing compound, a Ca-containing compound, a Mg-containing compound, a Al-containing compound, a Ti-containing compound, a Sc-containing compound, a Ge-containing compound, a V-containing compound, a Cr-containing compound, a Zr-containing compound, a Co-containing compound, a Ni-containing compound, a Zn-containing compound, a Cu-containing compound, a La-containing compound, a Ce-containing compound, a Mn-containing compound, a Hf-containing compound, a Nb-containing compound, a Ta-containing compound, a Mo-containing compound, a W-containing compound, a Ru-containing compound, a Ag-containing compound, a Sn-containing compound, a Pb-containing compound, and a Si-containing compound; preferably hydroxide, oxide, nitride, sulfide, sulfate, chloride, fluoride, carbonate, bicarbonate, nitrate or oxalate containing Li, Na, K, Ca, Mg, Al, Ti, Sc, Ge, V, Cr, Zr, Co, Ni, Zn, Cu, La, Ce, Mn, Hf, Nb, Ta, Mo, W, Ru, Ag, Sn, Pb or Si, which is soluble in solvent; more preferably, oxide, sulfate or hydroxide containing Nb, V, Mg, Zr, Nu, Cr, Ti, Al or Ce, which is soluble in solvent.

When the manganese-containing compound is mixed with a displacer in a solvent, the molar ratio of manganese element to the displacing element is preferably $(2-x):x$, wherein x preferably satisfies the following condition: $0 \leq x \leq 1$, more preferably $0.01 \leq x \leq 0.5$.

After obtaining the solution of manganese-containing compound, it is added with a precipitant so that manganese element and the displacing element form precipitate. In the present invention, the precipitant is alkali metal hydroxide solution, alkali metal carbonate solution or alkali metal bicarbonate solution, preferably, sodium carbonate, sodium bicarbonate, sodium hydroxide, potassium hydroxide or lithium hydroxide.

In the present invention, pH value of the solution of the manganese-containing compound is regulated with the precipitant to be preferably 6 to 13, more preferably 8 to 12.5, most preferably, 10 to 11. It is preferred that the precipitant is added dropwise under stirring. In the process of dropping the precipitant, the manganese element or displacing element dissolved in the solvent reacts with hydroxyl group, carbonate or bicarbonate radical in the precipitant to generate a precipitate.

The obtained precipitate is dried preferably in a vacuum oven at 80° C. for 8 h. The dried precipitate is calcined to give a positive electrode material precursor. It is preferred in the present invention to calcine the precipitate in a tube furnace. Flow rate of oxygen during the calcination is preferably 1 to 5 mL/min, more preferably 2 to 4 mL/min. The calcining temperature is preferably 300 to 800° C., more preferably 400 to 600° C. The calcining time is preferably 1 to 10 h, more preferably, 2 to 6 h.

A compound containing manganese, displacing element and oxygen is obtained following calcination. The compound is cooled and ground to obtain a positive electrode material precursor. According to the raw material adopted, the positive electrode material precursor contains manganese, oxygen, displacing element or halogen, N, P, S, etc.

After the positive electrode material precursor is obtained, it is used as a raw material to prepare a positive electrode material for lithium ion battery. First, the positive electrode material precursor, MnS and a lithium-containing compound are mixed, then calcined and annealed to form a positive electrode material.

In the present invention, MnS is a crystal face modifier for modifying the crystal shape of the obtained positive electrode material so as to give spheroidal crystals. The molar ratio of MnS to the lithium element in the lithium-containing compound is preferably $(0.001-0.1):(0.8-1.2)$, more preferably, $(0.005-0.08):(0.9-1.1)$, most preferably, $(0.01-0.05):(0.95-1.05)$.

In the present invention, the lithium-containing compound is a compound that contains lithium element, and is preferably one or more selected from the group consisting of lithium hydroxide, lithium carbonate, lithium nitrate, lithium oxalate, lithium chloride and lithium fluoride, more preferably, lithium hydroxide or lithium carbonate. The ratio of the molar number of the lithium-containing compound to the total molar number of the manganese element and the displacing element in the positive electrode material is preferably $(0.8-1.2):2$; more preferably, $(0.9-1.1):2$, most preferably, $(0.95-1.05):2$.

In the present invention, it is preferred to mix the positive electrode material precursor, MnS and a lithium-containing compound in a mixer using mixing balls, and the weight of the mixing balls is preferably two times of the total weight of the positive electrode material precursor, MnS and the lithium-containing compound.

The positive electrode material precursor, MnS and the lithium-containing compound are calcined in a resistance furnace after being mixed. The calcining temperature is preferably 750 to 1200° C., more preferably, 800 to 1100° C., most preferably 900 to 1000° C.; the calcining time is preferably 1 to 48 h, more preferably, 5 to 30 h, most preferably, 8 to 16 h. Calcining temperature has a great influence on the formation of spheroidal crystals and the performance thereof. The positive electrode material crystals obtained at high temperature have a relatively regular structure; when the calcining temperature is excessively low, the amount of spheroidal crystals in the formed crystals is low, and the obtained material has poor high-temperature cycling performance.

After calcination is completed, the resulting sintered body is cooled to room temperature, and ground to solid powder. Subsequently, the obtained solid powder is subjected to annealing, i.e. heated to a certain annealing temperature, held at that temperature for a period of time, and then cooled to give a positive electrode material.

In the present invention, it is preferred to anneal the solid powder in a resistance furnace. The annealing temperature is preferably 400 to 800° C., more preferably, 500 to 700° C., most preferably, 550 to 650° C. The annealing time is preferably 1 to 12 h, more preferably, 2 to 6 h, most preferably, 3 to 5 h. Annealing treatment confers the obtained positive electrode material with better spheroidal morphology as well as better filling capability and high-temperature cycling performance.

After the positive electrode material for lithium ion battery is obtained, the obtained positive electrode material is subjected to X-ray diffraction analysis. The result demonstrates that the material has a standard normal-spinel (FD-3M) cubic structure and contains no impurity phase, indicating it is applicable as a positive electrode material for lithium ion battery.

The obtained positive electrode material for lithium ion battery is observed with an electron microscope. The result shows that the positive electrode material for lithium ion battery obtained by the method provided in the present invention is spheroidal crystals having no obvious edges and corners, in which the crystal face forms an obtuse angle with the adjacent crystal faces. Since dissolution of manganese in the electrolyte mainly occurs at the places where the particle has a large curvature, i.e. at edges and sharp vertexes, and positive electrode material prepared in the present invention substantially has no edge or sharp vertex, dissolution of manganese in electrolyte is greatly decreased.

In the positive electrode material prepared by the method provided in the present invention, the amount of the spheroidal crystals is 50% or more, and the amount is 90% or more in most of such positive electrode materials. In the present invention, the spheroidal faces comprise the morphologies formed by intersection among the primary particles, the morphologies formed due to common crystal face among the primary particles or the morphologies that other primary particles grow on the surface of a primary particle, the morphologies formed by deficiency of a part of a primary particle, or the morphologies formed by complicated crystal faces sharing among primary particles.

The positive electrode material prepared in the present invention is placed in the electrolyte solution, and stands in oven at 60° C. for 7 days. Then, manganese dissolution is measured. The test shows the positive electrode material prepared in the present invention has low manganese dissolution in the electrolyte solution at high temperature.

Tap density of the positive electrode material prepared in the present invention is measured. The positive electrode material prepared in the present invention is mixed with acetylene black, polyvinylidene fluoride and N-methylpyrrolidone to manufacture a positive electrode plate, and compact density of the positive electrode plate is measured. The result shows the positive electrode material prepared in the present invention has good filling capability.

The present invention further provides a lithium ion battery, comprising a positive electrode, a negative electrode, an electrolyte disposed between the positive electrode and the negative electrode, where the positive electrode comprises a positive electrode material described in the aforementioned technical solutions or a positive electrode material prepared using the method described in the aforementioned technical solutions.

In the lithium ion battery, the positive electrode comprises a positive electrode material described in the aforementioned technical solutions or a positive electrode material prepared using the method described in the aforementioned technical solutions, and further comprises conventional materials such as acetylene black and polyvinylidene fluoride. The positive electrode is preferably prepared according to the following method:

mixing a positive electrode material described in the aforementioned technical solutions or a positive electrode material prepared using the method described in the aforementioned technical solutions with acetylene black, polyvinylidene fluoride and a solvent to obtain a slurry; and coating the slurry on the surface of an aluminum foil and then pressing to obtain a positive electrode.

The negative electrode of the lithium ion battery in the present invention is not particularly limited, and may be lithium, silicon or lithium alloy and the like, and it may also be carbon-based substances that can absorb or release lithium ions reversibly, such as graphite.

The electrolyte of the lithium ion battery in the present invention is not particularly limited, and may be liquid electrolyte, organic solid electrolyte or inorganic solid electrolyte, preferably, liquid electrolyte. When the electrolyte is a liquid electrolyte, the electrolyte may be at least one of lithium salts such as $LiClO_4$, $LiPF_6$, $LiBF_4$, and lithium trifluoromethanesulfonate, preferably, $LiPF_6$. The solvent may be carbonate(s) such as propylene carbonate, dihexyl carbonate, or may be sulfolanes such as sulfolane and dimethyl sulfoxide, or ether compounds such as dimethoxyethane, preferably, a mixture of ethylene carbonate (EC) with dimethyl carbonate (DMC) at a volume ratio of 1:1.

The positive electrode, electrolyte and negative electrode are assembled according to methods well known in the art to obtain a lithium ion battery.

The obtained lithium ion battery is subjected to a test of high-temperature cycling performance using a high-temperature testing instrument. The result shows the lithium ion battery provided in the present invention has good high-temperature cycling performance at 60° C.

In the present invention, a manganese-containing compound or a mixture of a manganese-containing compound and a displacer is mixed with a solvent, and then a precipitant is added to give a manganese-containing precipitate or a precipitate containing manganese and the displacing element. Afterwards, the precipitate is calcined to obtain a positive electrode material precursor. Then, the positive electrode material precursor is mixed with MnS and a lithium-containing compound, and the resultant mixture is calcined and annealed to form a positive electrode material for lithium ion battery. The positive electrode material prepared using the method provided in the present invention has a cubic spinel (FD-3m) structure, comprises lithium, manganese and oxygen as the main components, and is applicable for manufacturing positive electrodes of lithium ion batteries. Primary particles of the lithium manganese oxide positive electrode material prepared by the method provided in the present invention are spheroidal crystals. The crystal faces of the primary particle are connected with adjacent crystal planes by curved surfaces without obvious edges, and the angle formed between the crystal face and the adjacent crystal planes is an obtuse angle. The spheroidal structure not only provides high filling capability, but also imparts the lithium manganese oxide positive electrode material with a lower specific surface area and enables dissolution of manganese element at high temperature to occur less readily, thereby improving the high-temperature cycling performance and filling capability of the positive electrode material.

In order to further demonstrate the present invention, the positive electrode material for lithium ion battery, the method for preparing the same and the lithium ion battery provided in the present invention are described below in detail in combination with the following examples.

Examples 1-10

Lithium manganese oxide material precursor was prepared according to the raw materials, amounts and conditions shown in Table 1 by the following steps:

adding a displacer to a solution of a manganese-containing compound, slowly adding a precipitant dropwise under stirring, adjusting pH of the resultant mixed solution, and filtering to obtain a mixed precipitate; vacuum drying the mixed precipitate at 80° C. for 8 h, and calcining the dried mixed precipitate in a tube furnace at a oxygen gas flow rate of 2 mL/min to obtain the lithium manganese oxide material precursor.

Table 1 Formulae and conditions used for preparing lithium manganese oxide material precursors in examples 1-10 of the present invention.

|  | Manganese-containing compound | | Displacer | | Precipitant | | | Calcination | |
|---|---|---|---|---|---|---|---|---|---|
| Examples | Type | Concentration (mol/L) | Amount (L) | Type | Amount (g) | Type | Concentration (mol/L) | pH value | Temperature (° C.) | Time (h) |
| 1 | $MnSO_4$ | 2 | 1 | $AlCl_3$ | 14.4 | NaOH | 2 | 11.5 | 500 | 6 |
| 2 | $MnSO_4$ | 2 | 1 | $AlCl_3$ $Nb_2O_5$ | 13.06 2.86 | $Na_2CO_3$ | 2 | 8.5 | 500 | 3 |
| 3 | $MnSO_4$ | 2 | 1 | $AlCl_3$ $MgCl_2$ | 8.67 3.04 | $Na_2CO_3$ | 2 | 8 | 550 | 4 |
| 4 | $Mn(NO_3)_2$ | 2 | 1 | $AlCl_3$ $CoCl_2$ | 7.20 5.59 | NaOH | 2 | 12 | 600 | 5 |
| 5 | $Mn(NO_3)_2$ | 2 | 1 | $ZrO_2$ | 0.94 | NaOH | 2 | 11.5 | 650 | 6 |
| 6 | $MnCl_2$ | 2 | 1 | $YCl_3$ | 6.05 | NaOH | 2 | 11 | 500 | 3 |
| 7 | $MnSO_4$ | 2 | 1 | $NiSO_4$ | 13.33 | NiOH | 2 | 11.5 | 300 | 5 |
| 8 | $MnSO_4$ | 2 | 1 | $SrCl_2$ | 4.91 | NaOH | 2 | 12.5 | 550 | 6 |
| 9 | $MnSO_4$ | 2 | 1 | $MgCl_2$ | 8.17 | NaOH | 2 | 12 | 400 | 2 |
| 10 | $MnSO_4$ | 2 | 1 | $SnCl_4$ | 8.06 | NaOH | 2 | 11.5 | 600 | 4 |

Lithium manganese oxide material was prepared according to the raw materials, amounts and conditions shown in Table 2 by the following steps:

adding the lithium manganese oxide precursor, a lithium-containing compound and MnS as a crystal face modifier to a mixter, adding mixing balls at an amount of 2 times of the total weight of the lithium manganese oxide precursor, lithium salt and the crystal face modifier, calcining the resultant mixture, cooling to room temperature, grinding, sieving and then annealing, and cooling to room temperature to give the lithium manganese oxide material.

Figure 2:
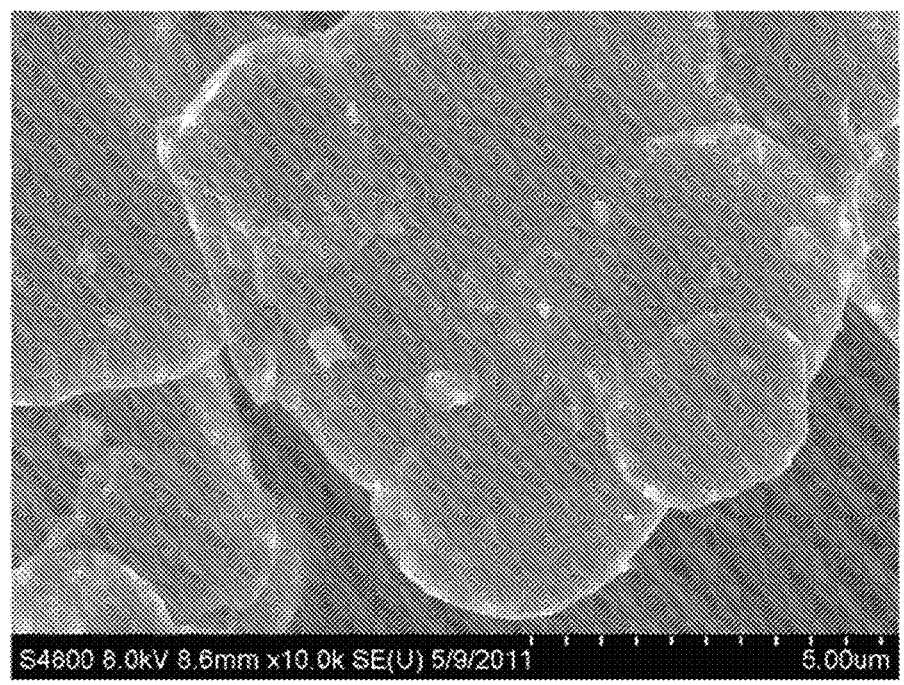
FIG. 2 shows a scan electron microscope (SEM) photograph of the lithium manganese oxide material provided in example 1 of the present invention.
Figure 3:
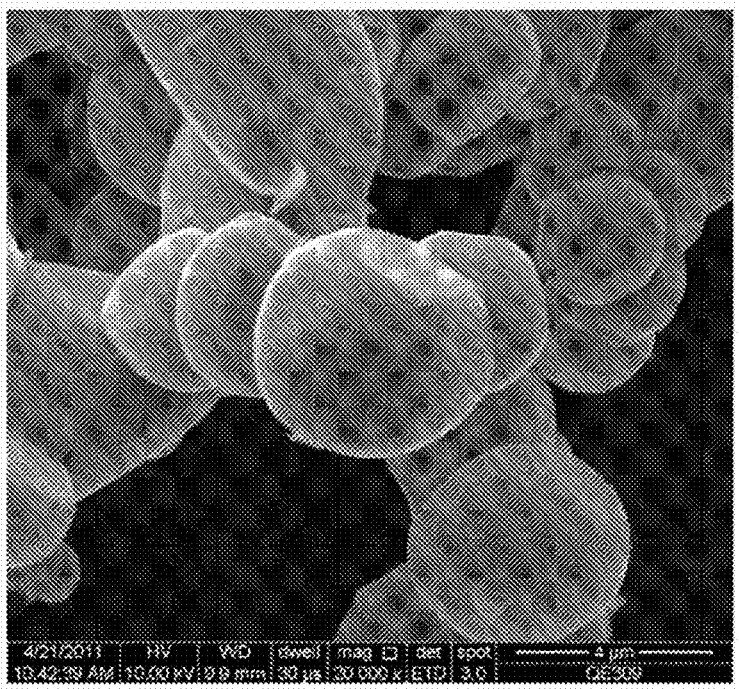
FIG. 3 shows a SEM photograph of the lithium manganese oxide material provided in example 2 of the present invention that is enlarged by 20,000 times.
Figure 4:
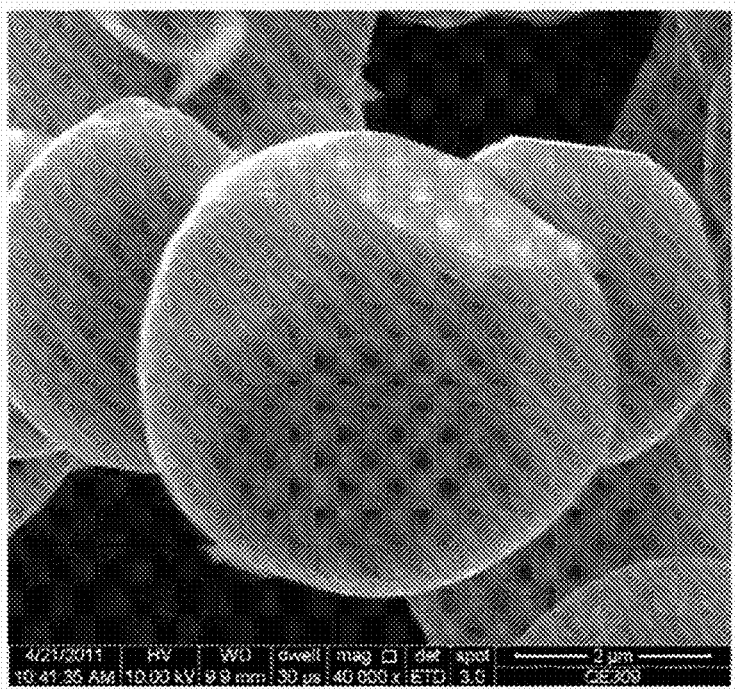
FIG. 4 shows a SEM photograph of the lithium manganese oxide material provided in example 2 of the present invention that is enlarged by 40,000 times.

Table 2 Formulae and conditions used for preparing lithium manganese oxide material in examples 1-10 of the present invention.

manganese oxide material provided in example 1 of the present invention. FIG. 3 shows a SEM photograph of the lithium manganese oxide material provided in example 2 of the present invention that is enlarged by 20,000 times. FIG. 4 shows a SEM photograph of the lithium manganese oxide material provided in example 2 of the present invention that is enlarged by 40,000 times. It can be known from FIGS. 2, 3 and 4 that, the lithium manganese oxide materials prepared in the present invention have spheroidal crystal structures without obvious edges or corners, and the angle between the crystal face and the adjacent crystal plane of the material is an obtuse angle and tends to be 0.

Tests on performance of the lithium manganese oxide materials were carried out. The results are provided in Table

| Examples | Lithium manganese oxide precursor (g) | Lithium-containing compound | | MnS (g) | Calcination | | Annealing | | Composition of the final product |
|---|---|---|---|---|---|---|---|---|---|
|  |  | Type | Amount (g) |  | Temperature | Time | Temperature | Time |  |
| 1 | 8 | LiOH | 2.12 | 0.05 | 950 | 20 | 550 | 10 | $Li(Li_{0.05}Mn_{1.85}Al_{0.10})O_4$ |
| 2 | 8.12 | LiOH | 2.48 | 0.01 | 950 | 10 | 650 | 10 | $Li(Li_{0.03}Mn_{1.84}Al_{0.11}Nb_{0.02})O_4$ |
| 3 | 8.25 | LiOH | 2.54 | 0.02 | 900 | 8 | 650 | 4 | $Li(Li_{0.04}Mn_{1.87}Al_{0.06}Mg_{0.03})O_4$ |
| 4 | 7.88 | LiOH | 2.26 | 0.05 | 850 | 24 | 600 | 5 | $Li(Li_{0.05}Mn_{1.86}Al_{0.05}Co_{0.04})O_4$ |
| 5 | 8.05 | LiOH | 2.38 | 0.04 | 950 | 16 | 550 | 6 | $Li(Li_{0.03}Mn_{1.95}Zr_{0.04})O_4$ |
| 6 | 8.45 | LiOH | 2.22 | 0.01 | 1000 | 5 | 500 | 3 | $Li(Li_{0.02}Mn_{1.96}Y_{0.02})O_4$ |
| 7 | 8.27 | $Li_2CO_3$ | 2.15 | 0.02 | 900 | 8 | 600 | 5 | $Li(Li_{0.06}Mn_{1.86}Ni_{0.08})O_4$ |
| 8 | 9.08 | $Li_2CO_3$ | 2.52 | 0.06 | 850 | 24 | 400 | 6 | $Li(Li_{0.02}Mn_{1.94}Sr_{0.04})O_4$ |
| 9 | 8.2 | $Li_2CO_3$ | 2.42 | 0.05 | 950 | 9 | 500 | 2 | $Li(Li_{0.05}Mn_{1.88}Mg_{0.07})O_4$ |
| 10 | 8.22 | $Li_2CO_3$ | 2.34 | 0.02 | 1050 | 6 | 700 | 4 | $Li(Li_{0.04}Mn_{1.92}Sn_{0.04})O_4$ |

A polycrystalline diffraction instrument from BRUKER AXS GMBH was used to perform X-ray diffraction analysis on the lithium manganese oxide material prepared in each example, with CuKα ray as a light source and a diffraction angle 2θ from 10° to 90°. The result is shown in FIG. 1. FIG. 1 represents X-ray diffraction pattern of the lithium manganese oxide material provided by example 1 of the present invention. It can be seen from FIG. 1 that, the lithium manganese oxide material prepared in example 1 has a standard normal-spinel (FD-3M) cubic structure and comprises no impurity phase. All of lithium manganese oxide materials prepared in examples 2-10 have standard normal-spinel (FD-3M) cubic structure and comprise no impurity phase.

The lithium manganese oxide materials were observed with electron microscope. The results are provided in FIGS. 2, 3 and 4. FIG. 2 shows the SEM photograph of the lithium 3. Table 3 shows the performance parameters of the lithium manganese oxide materials prepared in the examples and comparative example of the present invention.

To a 100 mL volumetric flask, 1 mol/L $LiPF_6$ solution in a mixture of ethylene carbonate (EC) and dimethyl carbonate (DMC) (volume ratio 1:1) was added, and then 2 g of lithium manganese oxide material prepared in each example was added. Subsequently, the volumetric flask was sealed and allowed to stand in an oven at 60° C. for 7 days. Then, the lithium manganese oxide material was removed with a centrifuge, and the solution was collected. Manganese content in the solution was measured with an Optima2100 type inductive coupled plasma emission spectrometer (Perkin-Elmer Company). The results are provided in Table 4. Table 4 shows the test results on manganese dissolution of the examples and comparative example of the present invention.

8 g of the lithium manganese oxide material prepared in each example, 1 g of acetylene black, 1 g of polyvinylidene fluoride and 30 g of N-methylpyrrolidone were mixed at normal temperature under normal pressure to form a slurry which was then uniformly coated on the surface of an aluminum foil to obtain an electrode plate. The electrode plate was dried at 80° C. and pressed to form a positive electrode plate, and the positive electrode plate was rolled with a roller press. A micrometer screw gauge was employed to measure the thickness of the positive electrode plate. The thicknesses of the positive electrode plate before and after rolling were recorded respectively, and compact densities were calculated. The results are provided in Table 5 which shows the test results on filling capability of the lithium manganese oxide materials provided in the examples and comparative example of the present invention.

Comparative Example 1

9.7 g of electrolytic manganese dioxide, 0.49 g aluminum hydroxide, and 2.66 g lithium hydroxide were charged into a mixer and mixed by adding 2-fold weight of mixing balls. The resultant mixture was calcined in a resistance furnace at 950° C. for 20 h, cooled to room temperature, ground, sieved, continuously calcined in a resistance furnace at 550° C. for 10 h, and cooled to room temperature again to obtain a lithium manganese oxide material which had an atomic composition represented by $Li_{1.05}Al_{0.1}Mn_{1.85}O_4$.

Figure 5:
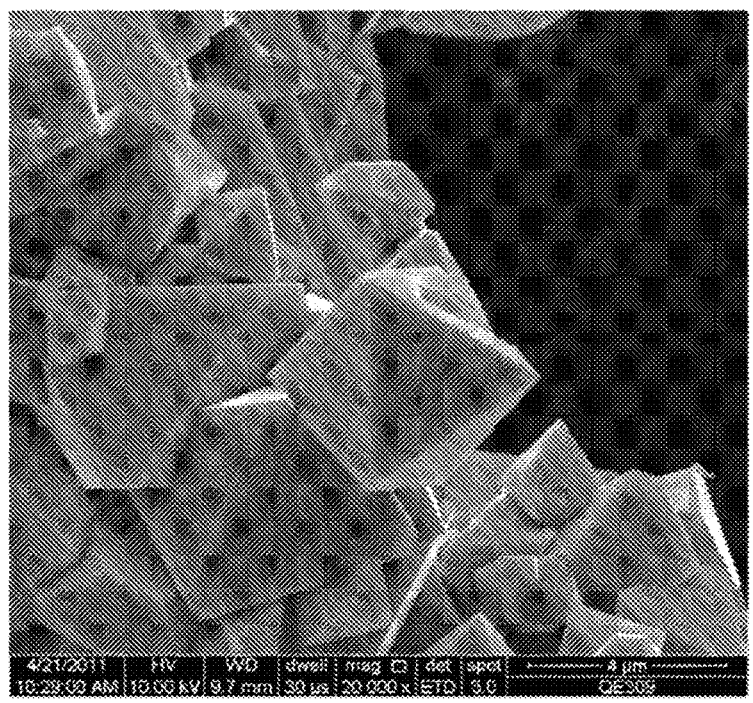
FIG. 5 shows a SEM photograph of the lithium manganese oxide material provided in comparative example 1.

The lithium manganese oxide material was observed with an electron microscope. The result is provided in FIG. 5. FIG. 5 shows the SEM photograph of the lithium manganese oxide material provided in comparative example 1 of the present invention. As can be seen from FIG. 5, the lithium manganese oxide material prepared in comparative example 1 has an octahedral shape and comprises sharp edges and vertexes.

Performance of the lithium manganese oxide material was tested. The result is provided in Table 3. Table 3 shows the performance parameters of the lithium manganese oxide materials prepared in the examples and comparative example of the present invention.

Table 3 Performance parameters of the lithium manganese oxide materials prepared in the examples and comparative example of the present invention It can be seen from Table 3 that, the lithium manganese oxide materials provided in the examples of the present application have higher tap density, lower specific surface area and smaller average particle size of primary particles.

To a 100 mL volumetric flask, 1 mol/L $LiPF_6$ solution in a mixture of ethylene carbonate (EC) and dimethyl carbonate (DMC) (volume ratio 1:1) was added, and then 2 g of the lithium manganese oxide material was added. Subsequently, the volumetric flask was sealed and allowed to stand in an oven at 60° C. for 7 days. Then, the lithium manganese oxide material was removed with a centrifuge, and the solution was collected. Manganese content in the solution was measured with an Optima2100 type inductive coupled plasma emission spectrometer (Perkin-Elmer Company). The result is provided in Table 4. Table 4 shows the test results on manganese dissolution of the examples and comparative example of the present invention.

Table 4 Test results on manganese dissolution of the examples and comparative example of the present invention

|  | Examples | | | | | | | | | | Comparative |
| --- | --- | --- | --- | --- | --- | --- | --- | --- | --- | --- | --- |
|  | 1 | 2 | 3 | 4 | 5 | 6 | 7 | 8 | 9 | 10 | example 1 |
| Mn content (mol/L) | 0.016 | 0.011 | 0.012 | 0.019 | 0.010 | 0.012 | 0.014 | 0.015 | 0.022 | 0.024 | 0.082 |

From Table 4, it can be seen that manganese dissolution of the spheroidal lithium manganese oxide material prepared in each example of the present invention is less than that of the lithium manganese oxide material having an octahedral shape.

8 g of the lithium manganese oxide material, 1 g of acetylene black, 1 g of polyvinylidene fluoride and 30 g of N-methylpyrrolidone were mixed at normal temperature under normal pressure to form a slurry which was then uniformly coated on the surface of an aluminum foil to obtain an electrode plate. The electrode plate was dried at 80° C. and pressed to form a positive electrode plate, and the positive electrode plate was rolled with a roller press. A micrometer screw gauge was employed to measure the thickness of the positive electrode plate. The thicknesses of the positive electrode plate before and after rolling were recorded respectively, and compact density was calculated. The results are provided in Table 5 which shows the test results on filling capability of the lithium manganese oxide materials provided in the examples and comparative example of the present invention.

Table 5 Test results on filling capability of the lithium manganese oxide materials provided in the examples and comparative example of the present invention

|  | Examples | | | | | | | | | | Comparative |
| --- | --- | --- | --- | --- | --- | --- | --- | --- | --- | --- | --- |
|  | 1 | 2 | 3 | 4 | 5 | 6 | 7 | 8 | 9 | 10 | example 1 |
| Tap density (g/cm³) | 1.96 | 2.04 | 1.89 | 2.01 | 2.1 | 2.11 | 1.9 | 1.96 | 2.02 | 1.88 | 1.72 |
| Specific surface area | 0.4 | 0.3 | 0.3 | 0.6 | 0.3 | 0.7 | 0.5 | 0.6 | 0.4 | 0.5 | 1.5 |
| Average particle size of primary particles (μm) | 3 | 3 | 5 | 2 | 4 | 5 | 6 | 3 | 2 | 4 | 4 |

|  | Examples | | | | | | | | | | Comparative |
| --- | --- | --- | --- | --- | --- | --- | --- | --- | --- | --- | --- |
|  | 1 | 2 | 3 | 4 | 5 | 6 | 7 | 8 | 9 | 10 | example 1 |
| Thickness before rolling ($\mu$m) | 23.4 | 23.2 | 23 | 23.8 | 22.8 | 22.8 | 23.6 | 24 | 23.8 | 24.2 | 23.8 |
| Thickness after rolling ($\mu$m) | 20.4 | 20.4 | 20.2 | 21 | 20 | 20 | 20.8 | 21.2 | 21 | 21.2 | 20.2 |
| Compact density (g/cm$^3$) | 3.05 | 2.91 | 2.8 | 2.92 | 2.86 | 2.9 | 2.98 | 2.88 | 2.94 | 3.12 | 2.72 |

From Table 5, it can be seen that filling capability of the spheroidal lithium manganese oxide material prepared in the examples of the present invention is superior to that of the lithium manganese oxide material having an octahedral shape prepared in comparative example 1.

Example 11

8 g of the lithium manganese oxide material prepared in example 1, 1 g of acetylene black, 1 g of polyvinylidene fluoride and 30 g of N-methylpyrrolidone were mixed at normal temperature under normal pressure to form a slurry which was then uniformly coated on the surface of an aluminum foil to obtain an electrode plate. The electrode plate was dried at 80° C., pressed and cut into circular sheets having an area of 1.32 cm$^2$. A lithium ion battery was assembled in a glovebox filled with argon gas with the circular sheet as positive electrode, a pure lithium sheet as negative electrode and a 1 mol/L LiPF$_6$ solution in a mixture of ethylene carbonate (EC) and dimethyl carbonate (DMC) (volume ratio 1:1) as electrolyte.

Figure 6:
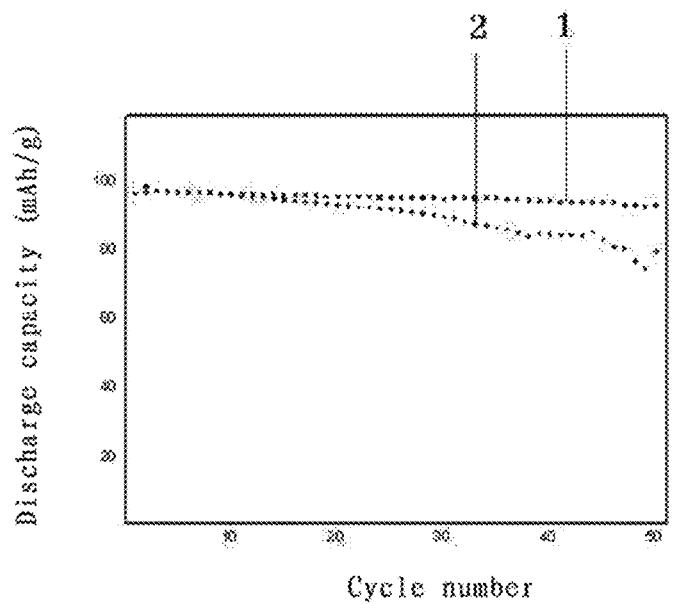
FIG. 6 shows the high-temperature cycling curves of the lithium ion batteries provided in the examples and comparative examples of the present invention.

A high-temperature testing instrument was employed to measure cycling performance of the lithium ion battery at a temperature of 60° C. with a charge/discharge current of 0.4 mA/cm$^2$, a charge cut-off voltage of 4.35 V and a discharge cut-off voltage of 3.0 V. The result is provided in FIG. 6. FIG. 6 shows high-temperature cycling curves of the lithium ion batteries provided in the examples and comparative example of the present invention, wherein curve 1 represents the high-temperature cycling curve of the lithium ion battery provided in example 11, and curve 2 represents the high-temperature cycling curve of the lithium ion battery provided in comparative example 2.

Comparative Example 2

8 g of the lithium manganese oxide material prepared in comparative example 1, 1 g of acetylene black, 1 g of polyvinylidene fluoride and 30 g of N-methylpyrrolidone were mixed at normal temperature under normal pressure to form a slurry which was then uniformly coated on the surface of an aluminum foil to obtain an electrode plate. The electrode plate was dried at 80° C., pressed and cut into circular sheets having an area of 1.32 cm$^2$. A lithium ion battery was assembled in a glovebox filled with argon gas with the circular sheet as positive electrode, a pure lithium sheet as negative electrode and a 1 mol/L LiPF$_6$ solution in a mixture of ethylene carbonate (EC) and dimethyl carbonate (DMC) (volume ratio 1:1) as electrolyte.

A high-temperature testing instrument was employed to measure cycling performance of the lithium ion battery at a temperature of 60° C. with a charge/discharge current of 0.4 mA/cm$^2$, a charge cut-off voltage of 4.3 V and a discharge cut-off voltage of 3.0 V. The result is provided in FIG. 6. FIG. 6 shows high-temperature cycling curves of the lithium ion batteries provided in the examples and comparative example of the present invention, wherein curve 1 represents the high-temperature cycling curve of the lithium ion battery provided in example 11, and curve 2 represents the high-temperature cycling curve of the lithium ion battery provided in comparative example 2. As can be seen from FIG. 6, high-temperature cycling performance of the lithium ion battery provided in each example of the present application is superior to that of the lithium ion battery provided in comparative example 2.

From the above-described examples and comparative examples, it can be seen that the method provided in the present invention can prepare a lithium manganese oxide material with a spheroidal structure which has good high-temperature cycling performance and filling capability.

The aforementioned illustration to the examples disclosed can enable a person skilled in the art to carry out or use the present invention. A plurality of variants of these examples will be obvious to a person skilled in the art. The general principle defined herein can be carried out in other examples without deviating from the spirit or scope of the present invention. Therefore, the present invention shall not be limited to these examples provided, but claims the broadest scope that is consistent with the principle and novel features disclosed herein.

The invention claimed is:
1. A preparing method of a positive electrode material for lithium ion battery, comprising the following steps:
 a) mixing a manganese-containing compound with a solvent to obtain a solution of the manganese-containing compound;
 b) adding a precipitant to the solution of the manganese-containing compound obtained from the step a) to form a precipitate, the precipitant being alkali metal hydroxide solution, alkali metal carbonate solution or alkali metal bicarbonate solution;
 c) calcining the precipitate obtained from the step b) to give a positive electrode material precursor;
 d) mixing the positive electrode material precursor obtained from the step (c), MnS and a lithium-containing compound, then calcining and grinding to obtain a solid powder; and
 e) subjecting the solid powder obtained from the step d) to annealing treatment to give the positive electrode material for lithium ion battery, wherein the positive electrode material for lithium ion battery has an atomic composition represented by formula (I) and has a crystal structure of cubic spinel of FD-3m:

$$Li_a(M_xMn_{2-x})(O_{4-y}Z_y) \quad (I);$$

wherein $0.8 \leq a \leq 1.2$, $0 \leq x \leq 1$, $0 \leq y \leq 1$;

M is one or more selected from the group consisting of Li, Na, K, Ca, Mg, Al, Ti, Sc, Ge, V, Cr, Zr, Co, Ni, Zn, Cu, La, Ce, Mn, Hf, Nb, Ta, Mo, W, Ru, Ag, Sn, Pb, and Si; and Z is one or more selected from the group consisting of OH, halogen, N, P, S and O;

wherein MnS is used as a crystal face modifier for modifying the crystal shape of the obtained positive electrode material;

wherein in the step d), the molar ratio of MnS to the lithium element in the lithium-containing compound is (0.001-0.1):(0.8-1.2), in the step c), the calcining temperature is 300 to 800° C., and the calcining time is 1 to 10 h, in the step d), the calcining temperature is 750 to 1200° C., and the calcining time is 1 to 48 h, and in the step e), the annealing temperature is 400 to 800° C., and the annealing time is 1 to 12 h.

2. A preparing method according to claim 1, characterized in that the step a) specifically comprises:

mixing a manganese-containing compound with a displacer in a solvent to obtain a solution of the manganese-containing compound, the displacer being one or more selected from the group consisting of a Li-containing compound, a Na-containing compound, a K-containing compound, a Ca-containing compound, a Mg-containing compound, a Al-containing compound, a Ti-containing compound, a Sc-containing compound, a Ge-containing compound, a V-containing compound, a Cr-containing compound, a Zr-containing compound, a Co-containing compound, a Ni-containing compound, a Zn-containing compound, a Cu-containing compound, a La-containing compound, a Ce-containing compound, a Mn-containing compound, a Hf-containing compound, a Nb-containing compound, a Ta-containing compound, a Mo-containing compound, a W-containing compound, a Ru-containing compound, a Ag-containing compound, a Sn-containing compound, a Pb-containing compound, and a Si-containing compound.

3. A preparing method according to claim 2, characterized in that the manganese-containing compound is one or more selected from the group consisting of manganese sulfate, manganese carbonate, manganese nitrate, manganese chloride, and manganese oxalate.

4. A preparing method according to claim 2, characterized in that the solvent is water, methanol, ethanol or acetone.

5. A preparing method according to claim 1, characterized in that the step b) specifically comprises:

adding a precipitant to the solution of the manganese-containing compound obtained from the step a) and regulating pH value to 6 to 13 to give a precipitate.

6. A preparing method according to claim 1, characterized in that the lithium-containing compound in the step d) is one or more selected from the group consisting of lithium hydroxide, lithium carbonate, lithium nitrate, lithium oxalate, lithium chloride and lithium fluoride.

* * * * *